(12) United States Patent
White (10) Patent No.: US 11,352,141 B2
(45) Date of Patent: Jun. 7, 2022

(54) SEALABLE LIFE VEST STOWAGE DEVICE

(71) Applicant: Servecorp Limited, Crawley (GB)

(72) Inventor: Noel Gregory Philip White, Haywards Heath (GB)

(73) Assignee: Servecorp Limited, Crawley (GB)

( * ) Notice: Subject to any disclaimer, the term of this patent is extended or adjusted under 35 U.S.C. 154(b) by 0 days.

(21) Appl. No.: 16/701,178

(22) Filed: Dec. 3, 2019

(65) Prior Publication Data

US 2020/0102079 A1 Apr. 2, 2020

Related U.S. Application Data

(62) Division of application No. 16/070,282, filed as application No. PCT/EP2017/050783 on Jan. 16, 2017, now abandoned.

(30) Foreign Application Priority Data

Jan. 15, 2016 (GB) .................................. 1600820
Jan. 25, 2016 (GB) .................................. 1601333

(51) Int. Cl.
*B64D 11/06* (2006.01)
*A45C 13/10* (2006.01)
(Continued)

(52) U.S. Cl.
CPC ............ *B64D 11/0631* (2014.12); *A45C 3/00* (2013.01); *A45C 3/10* (2013.01); *A45C 13/02* (2013.01);
(Continued)

(58) Field of Classification Search
CPC ......... B65D 11/0631; A45C 3/00; A45C 3/10; A45C 13/02; A45C 13/1038;
(Continued)

(56) References Cited

U.S. PATENT DOCUMENTS

| 7,252,569 | B2* | 8/2007 | Everhart | ................ B64D 11/06 206/769 |
| 2013/0038473 | A1* | 2/2013 | Lamoree | ............ B64D 11/0631 340/945 |
| 2015/0034641 | A1 | 2/2015 | Aruga | |
| 2019/0016462 | A1 | 1/2019 | | |

FOREIGN PATENT DOCUMENTS

| EP | 2636332 | 9/2013 |
| GB | 2519180 | 4/2015 |
| GB | 2523179 | 8/2015 |

(Continued)

OTHER PUBLICATIONS

International Search Report and the Written Opinion dated May 17, 2017 From the International Searching Authority Re. Application No. PCT/EP2017/050783. (9 Pages).
Official Action dated Sep. 4, 2019 From the US Patent and Trademark Office Re. U.S. Appl. No. 16/070,282. (13 pages).

(Continued)

*Primary Examiner* — Jacob K Ackun (57) ABSTRACT

A life vest stowage device comprises a receptacle with a receptacle opening. The device has first and second tabs with first and second tab apertures. In a closed configuration, a closure flap is in a folded position in which it at least partially covers the opening. The first and second tabs are exposed through the closure flap to allow access to the tab apertures from an outer side of the closure flap. A pull strap extends from the interior volume through the opening and over the outer side of the closure flap. The pull strap has a pull strap aperture securable to the first and second tab apertures by a frangible seal, such that the closure flap can only be moved to an unfolded position by moving the pull strap aperture and the first and second tab apertures away from one another so as to break the frangible seal.

18 Claims, 6 Drawing Sheets

(51) Int. Cl.
  *B63C 9/125* (2006.01)
  *A45C 13/02* (2006.01)
  *A45C 3/10* (2006.01)
  *A45C 3/00* (2006.01)
  *A45C 13/30* (2006.01)

(52) U.S. Cl.
  CPC ...... *A45C 13/1038* (2013.01); *A45C 13/1053* (2013.01); *A45C 13/30* (2013.01); *B63C 9/1255* (2013.01); *A45C 2013/026* (2013.01)

(58) Field of Classification Search
  CPC ................ A45C 13/1053; A45C 13/30; A45C 2013/026; B63C 9/1255
  USPC .................. 297/188.08, 188.13; 206/278
  See application file for complete search history.

(56) References Cited

FOREIGN PATENT DOCUMENTS

| WO | WO 2015/145121 | 10/2015 |
|---|---|---|
| WO | WO 2017/121895 | 7/2017 |

OTHER PUBLICATIONS

Patents Act 1977: Combined Search and Examination Report Under Sections 17 and 18(3) dated Jun. 28, 2016 From the Intellectual Property Office of the United Kingdom of Great Britain Re. Application No. GB1601333.6 (6 Pages).

Restriction Official Action dated Jun. 26, 2019 From the US Patent and Trademark Office Re. U.S. Appl. No. 16/070,282. (9 pages).

\* cited by examiner

SEALABLE LIFE VEST STOWAGE DEVICE

RELATED APPLICATIONS

This application is a divisional application of U.S. patent application Ser. No. 16/070,282, filed on Jul. 15, 2018, which is a National Phase of PCT Patent Application No. PCT/EP2017/050783 having International filing date of Jan. 16, 2017, which claims the benefit of priority of United Kingdom Patent Applications Nos. 1600820.3 filed on Jan. 15, 2016, and 1601333.6 filed on Jan. 25, 2016. The contents of the above applications are all incorporated by reference as if fully set forth herein in their entirety.

FIELD AND BACKGROUND OF THE INVENTION

This disclosure relates to a sealable life vest stowage device usable for stowing a life vest on a commercial passenger aircraft.

Aviation regulations require commercial passenger aircraft to carry a life vest (or "life jacket") for each passenger. The life vest must be accessible to the passenger for use in the event of an emergency. In order to comply with these regulations, a life vest is usually stowed under each seat in a commercial passenger aircraft.

Life vest stowage devices are available for stowing life vests under aircraft seats. Regulations require that the life vest should remain stowed in its life vest stowage device in the event of the aircraft suffering an impact of up to 16G. On the other hand, the life vest stowage device must also allow for easy removal of a life vest in the event of an emergency.

Security requirements for life vest stowage devices are becoming increasingly stringent, and airlines are seeking ways to meet the security requirements with minimum time and expense. This has led to life vest stowage devices being sealed shut, so that visual inspection of the seal can determine if a life vest stowage device has been accessed and the need to thoroughly search inside life vest stowage devices is circumvented.

Increasingly complex closures and security seals have been proposed. In particular, the use of seals incorporating Radio Frequency Identification (RFID) technology has been proposed in order to further reduce inspection time. RFID technology offers the prospect of avoiding even visual inspection life vest stowage devices. Each life vest stowage device is sealed using a RFID seal that ceases to operate if the seal is broken. An RFID reader can then be used to establish very quickly if any of the RFID seals on an aircraft are inoperable, and to identify the location of the offending life vest stowage device.

Although the benefits of this type of technology are appreciated, a need remains for life vest stowage devices with simple sealing mechanisms.

SUMMARY OF THE INVENTION

According to one aspect of the disclosure, there is provided a life vest stowage device comprising:

a receptacle defining an interior volume;

an opening through which the interior volume is accessible from outside of the receptacle;

a first tab having a first tab aperture;

a closure flap moveable between an unfolded position when the life vest stowage device is in an open configuration, in which unfolded position the opening is uncovered, and a folded position when the life vest stowage device is in a closed configuration, in which folded position the closure flap at least partially covers the opening and the first tab is exposed through the closure flap to allow access to the first tab aperture from an outer side of the closure flap;

a pull strap extending from the interior volume through the opening so as to be able to pass over the outer side of the closure flap, the pull strap having a pull strap aperture;

wherein, in the closed configuration, the pull strap is securable to the first tab from the outer side of the closure flap by a frangible seal extending between the pull strap aperture and the first tab aperture such that the closure flap can only be moved to the unfolded position by moving the pull strap aperture and the first tab aperture away from one another so as to break the frangible seal.

In the closed configuration, a portion of the pull strap may lie between the closure flap and the receptacle such that pulling an end of the pull strap distal from the receptacle away from the receptacle causes the closure flap to move to the unfolded position.

The frangible seal may comprise a seal head and an elongate member, wherein the elongate member cooperates with the seal head to form a closed loop, and wherein breaking the frangible seal involves breaking the closed loop. The elongate member may be attached at one end to the seal head and the seal head may have a seal head aperture through which the other end of the elongate member can be inserted to form the loop. The elongate member and the seal head aperture may form a ratchet arranged such that the elongate member resists withdrawal from the side of the seal head aperture via which it is inserted. The elongate member resists withdrawal from the side of the seal head aperture via which it is inserted sufficiently that the closed loop breaks by the elongate member breaking rather than withdrawing from the seal head aperture.

The frangible seal is polypropylene or nylon.

The closure flap may have a first closure flap aperture through which the first tab is exposed in the closed configuration. Preferably, the life vest stowage device has a second tab having a second tab aperture, wherein, in the closed configuration, the second tab aperture is exposed through the closure flap to allow access to the second tab aperture from the outer side of the closure flap and the pull strap is securable to the second tab from the outer side of the closure flap by the frangible seal additionally extending between the pull strap aperture and the second tab aperture such that the closure flap can only be moved to the unfolded position by moving the pull strap aperture away from both the first tab aperture and the second tab aperture so as to break the frangible seal. The closure flap may have a second closure flap aperture through which the second tab is exposed in the closed configuration.

In the closed configuration, the pull strap may be locatable between the first tab and second tab.

Preferably, the life vest stowage device comprises an inner flap located towards the interior volume of the receptacle inward in relation to the closure flap, the inner flap being foldable between the unfolded position when the life vest stowage device is in the open configuration, in which unfolded position the opening is uncovered, and a folded position when the life vest stowage device is in the closed configuration, in which folded position the inner flap at least partially covers the opening.

Optionally, the life vest stowage device has a pocket into which the inner flap is insertable in the folded configuration.

Optionally, the life vest stowage device has a pocket into which the closure flap is insertable in the folded configuration.

Optionally, the life vest stowage device comprises first and second tab receiving apertures, the first tab having a tab head wider than the first tab receiving aperture and a neck narrower than the first tab receiving aperture, and the second tab having a tab head wider than the second tab receiving aperture and a neck narrower than the second tab receiving aperture.

The life vest stowage device may comprise a first material and the closure flap may comprise a second material. The second material may be stiffer than the first material. In one example, the second material is a polycarbonate film.

Specific embodiments are described below, by way of example only, with reference to the accompanying drawings.

DESCRIPTION OF SPECIFIC EMBODIMENTS OF THE INVENTION

Referring to FIGS. 1 to 5, a life vest stowage device 1 according to an embodiment of the disclosure comprises a receptacle 2 with an receptacle opening 3. In this embodiment, the life vest stowage device 1 is suitable for use on a commercial passenger aircraft. As such, the receptacle 2 is suitable for housing a life vest 4 and the receptacle opening 3 allows the life vest 4 to be inserted into and removed from the receptacle 2. The life vest stowage device 1 is securable under an aircraft seat, and straps or other mountings (not shown) are provided on the life vest stowage device 1 for this purpose, but are omitted from the accompanying drawings for clarity.

Conventionally, three different sizes of life vest 4 are specified for use on commercial passenger aircraft. When folded for stowing, a small life vest 4 is approximately 24 cm long, 13 cm wide and 6 cm deep; a medium life vest 4 is approximately 22 cm long, 16 cm wide and 6 cm deep and a large life vest 4 is approximately 22 cm long, 20 cm wide and 7 cm deep. Typically, the receptacle 2 is large enough to be able to house a large life vest 4 snugly.

In this embodiment, the receptacle 2 is a bag. The bag comprises two layers of a first material secured to one another at their edges, except at one end on the receptacle 2 where the edges of the layers are left unattached to one another to provide the receptacle opening 3. The receptacle opening 3 extends across the entire width of the receptacle 2. In this embodiment, the two rectangles of the first material are secured to one another by stitching, but other methods of securing the layers of the first material to one another can be used, such as joining with glue or by heat treatment. The first material is a cloth. The cloth is typically fire resistant, and in this embodiment is a polyamide substrate with polyurethane coating and a fluorocarbon finish. In order to accommodate a large life vest 4 snugly, the bag has a length L of approximately 26 cm and a width W of approximately 24 cm. The bag is flat when empty, and accommodates the life vest 4 by deforming to a required height, in a direction normal to the plane defined by its length and width. In other embodiments, the bag is of a different construction or has different dimensions. It is also possible for the receptacle 2 to be a box that is substantially non-deformable instead of a bag.

The life vest stowage device 1 has an inner flap 5 extending outwardly from a first side of the receptacle opening 3. In this embodiment, the inner flap 5 is contiguous with a first side wall of the receptacle 2 on the first side of the receptacle opening 3. The inner flap 5 may be integral with the receptacle 2, for example being the same material as the receptacle 2. More specifically, the inner flap 5 may be part of one of the two layers of the first material that are secured to one another to form the receptacle 2. However, in this embodiment, the inner flap 5 comprises a strip of the first material secured to the first side wall of the receptacle 2 on the first side of the receptacle opening 3.

Figure 1:
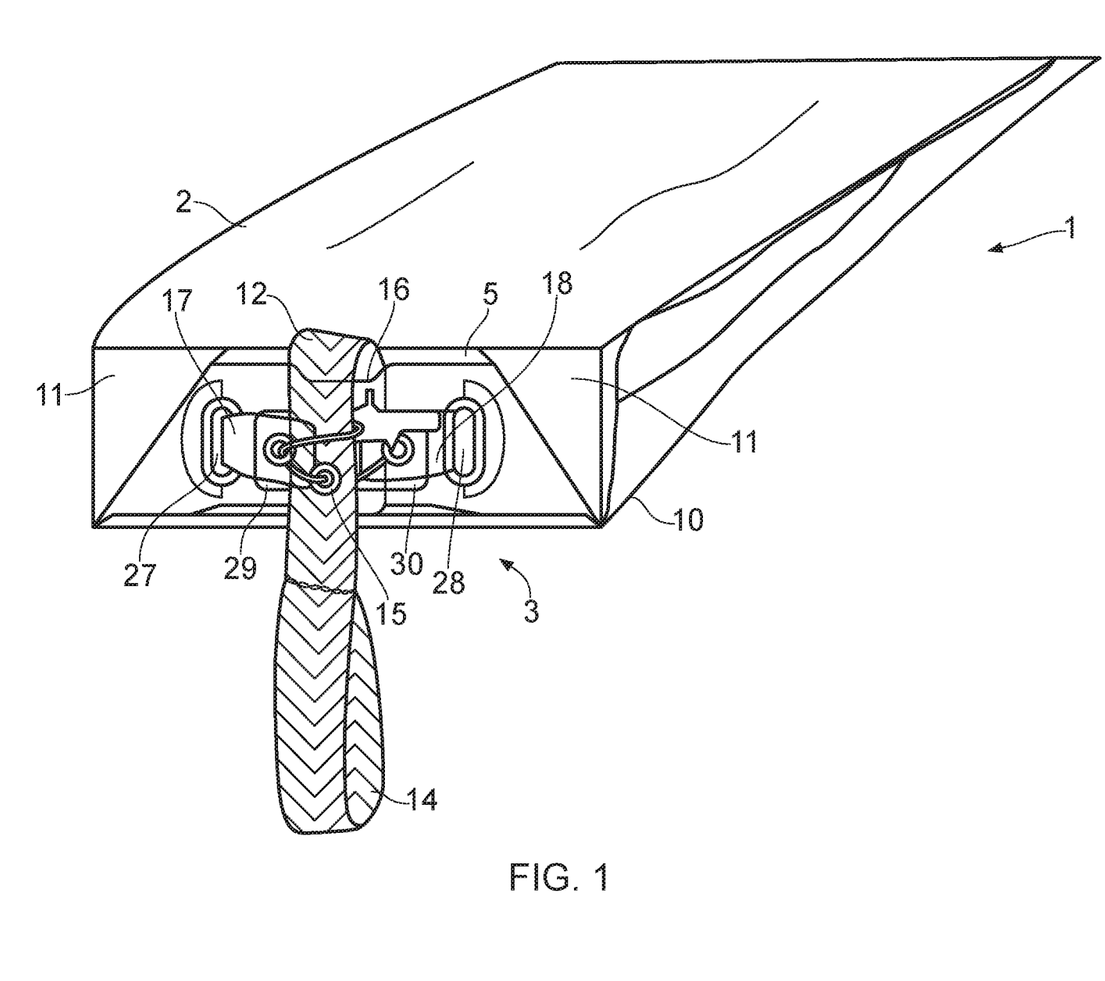
FIG. 1 is a perspective view of a life vest stowage device is a closed configuration.
Figure 2:
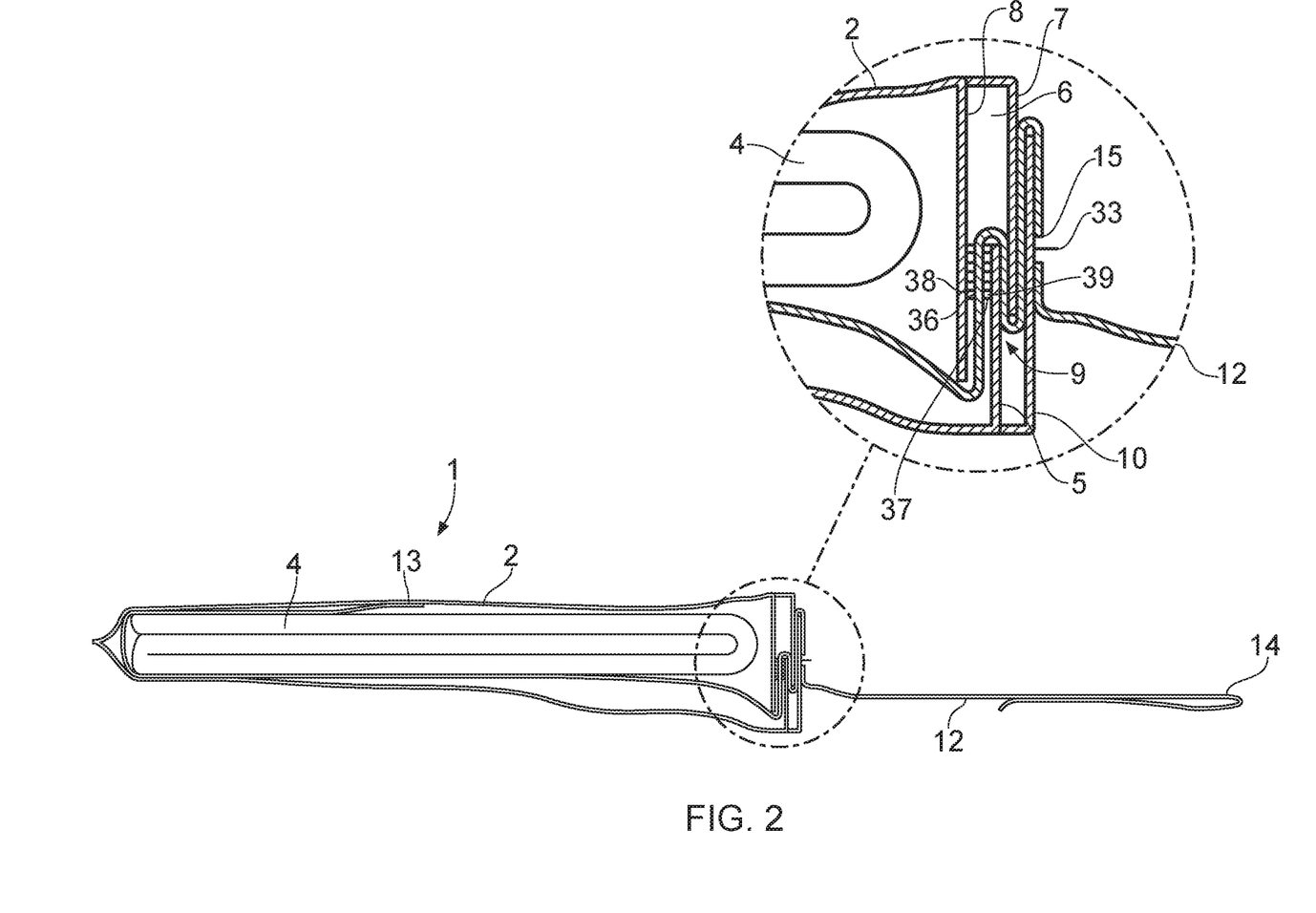
FIG. 2 is a cross-sectional view of the life vest stowage device in the closed configuration, including a close up view of an end of the life vest stowage device where a closure flap is provided.
Figure 3:
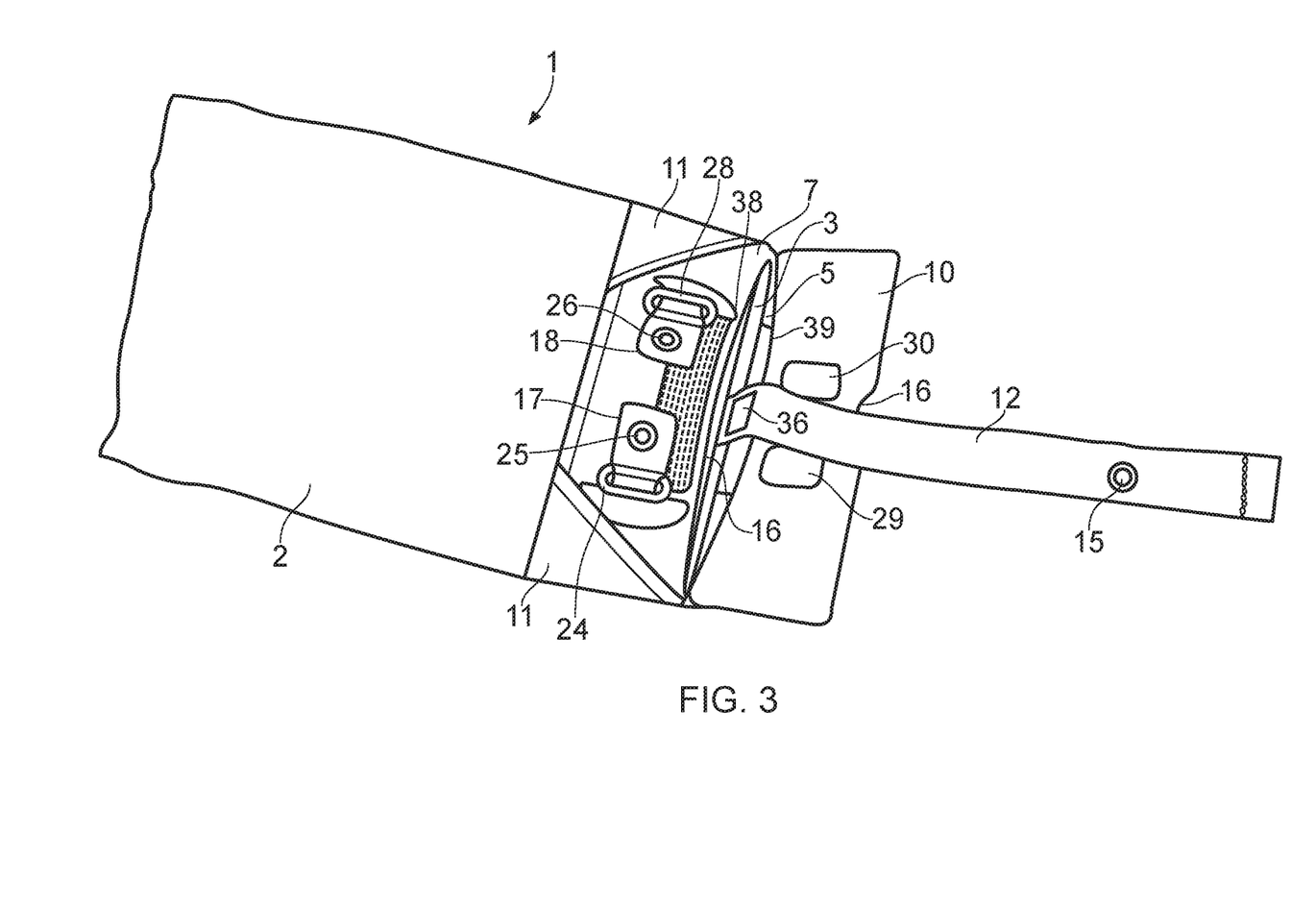
FIG. 3 is a perspective view of the life vest stowage device in an open configuration.
Figure 4:
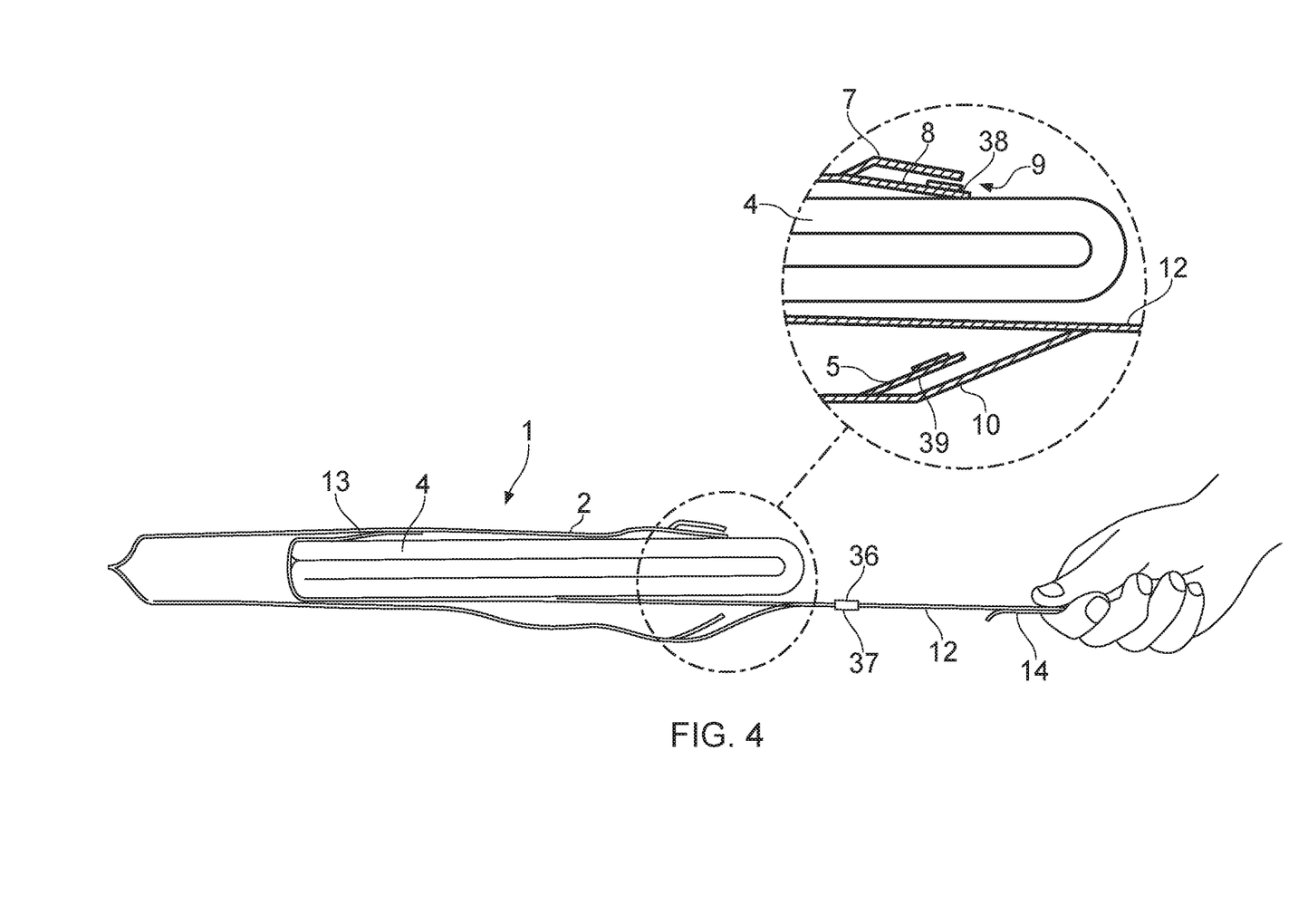
FIG. 4 is a cross-sectional view of the life vest stowage device in the open configuration, including a close up view of the end of the life vest stowage device where the closure flap is provided.

The life vest stowage device 1 has a closed configuration, as shown in FIGS. 1 and 2, and an open configuration, as shown in FIGS. 3 and 4. With the life vest stowage device 1 in the closed configuration, the inner flap 5 is in a folded position. In the folded position, the inner flap 5 at least partially covers the receptacle opening 3. In this embodiment, the inner flap 5 extends across the entire width of the receptacle 2. In other words, the inner flap 5 has the same width as the receptacle 2. This means that, in the folded position, the inner flap 5, in combination with a second side wall of the receptacle 2 on a second side of the receptacle opening 3, opposite to the first side, entirely blocks the receptacle opening 3.

With the life vest stowage device 1 in the open configuration, the inner flap 5 is in an unfolded position. In the unfolded position, the inner flap 5 does not obstruct the receptacle opening 3. Specifically, in this embodiment, the inner flap 5 is generally parallel to the first side wall of the receptacle 2. The inner flap 5 can be moved between the unfolded and the folded positions. The movement occurs by folding and unfolding the inner flap 5 along the edge of the inner flap 5 that is attached to the receptacle 2.

In this embodiment, an edge of the inner flap 5 distal to the receptacle 2 is shorter than an edge of the inner flap 5 that is attached to the receptacle 2. As such, the inner flap 5 is trapezoidal in shape.

The life vest stowage device 1 has an inner flap pocket 6 on the second side of the receptacle opening 3. A pocket side wall 7 is secured to a portion 8 of the second side wall of the receptacle 2 on the second side of the receptacle opening 3. The pocket side wall 7 is secured along its edges to the portion 8 of the second side wall of the receptacle 2, except at an edge of the pocket side wall 7 closest to the receptacle opening 3, which edge is left unattached to provide a pocket opening 9. The inner flap pocket 6 extends across the entire width of the receptacle 2, and has a depth similar to or greater than the length of the inner flap 5, that is the distance between the edge of the inner flap 5 distal to the receptacle 2 and the edge of the inner flap 5 attached to the receptacle 2. The inner flap 5 can be inserted into the inner flap pocket 6 in the folded position.

The life vest stowage device 1 also a closure flap 10 extending outward from the first side of the receptacle opening 3, which is the same side of the receptacle opening 3 as the inner flap 5. In this embodiment, the closure flap 10 is contiguous with the first side wall of the receptacle 2 on the first side of the receptacle opening 3. The closure flap 10 may be integral with the receptacle 2, for example being the same material as the receptacle 2. More specifically, the closure flap 10 may be part of one of the two layers of the first material that are secured to one another to form the receptacle 2. In this case, the inner flap 5 may be a separate strip of material. However, in this embodiment, the closure flap 10 comprises a strip of a second material secured to the first side wall of the receptacle 2 on the first side of the receptacle opening 3. The second material is stiffer than the first material. In this embodiment, the second material a polycarbonate film, such as Lexan®.

With the life vest stowage device 1 in the closed configuration, the closure flap 10 is in a folded position. In the folded position, the closure flap 10 at least partially covers the receptacle opening 3. In this embodiment, the closure flap 10 extends across the entire width of the receptacle 2. In other words, the closure flap 10 has the same width as the receptacle 2. In the folded position, the closure flap 10, in conjunction with the second side wall of the receptacle 2 on the second side of the receptacle opening 3, entirely blocks the receptacle opening 3.

The closure flap 10 is located outward of the inner flap 5, in relation to the receptacle opening 3. This means that, in the closed configuration, the closure flap 10 at least partially covers the inner flap 5. In this embodiment, the closure flap 10 has a length between an edge of the closure flap 10 distal to the receptacle 2 and an edge of the closure flap 10 attached to the receptacle 2 greater than the length of the inner flap 5 between the edge of the inner flap 5 distal to the receptacle 2 and the edge of the inner flap 5 attached to the receptacle 2. This allows the closure flap 10 to cover the inner flap 5 entirely in the closed configuration. The closure flap 10 is also arranged to at least partially cover the pocket side wall 7 in the folded position.

With the life vest stowage device 1 in the open configuration, the closure flap 10 is in an unfolded position. In the unfolded position, the closure flap 10 does not obstruct the receptacle opening 3. Specifically, in this embodiment, the closure flap 10 is generally parallel to the first side wall of the receptacle 2 on the first side of the receptacle opening 3 in the unfolded position. The closure flap 10 is arranged to be moved between the unfolded and the folded positions. The movement occurs by folding and unfolding the closure flap 10 along the edge of the closure flap 10 that is attached to the receptacle 2.

The receptacle 2 has two closure flap pockets 11 for accommodating the closure flap 10 in the folded position, although it will be appreciated than only one closure flap pocket 11 is useful in itself and, in other embodiments, only one pocket 11 is provided. The closure flap pockets 11 are located at corners of the pocket side wall 7 distal to the receptacle opening 3. The closure flap pockets 11 are triangular and are located on an outwardly facing of the pocket side wall 7. The closure flap pockets 11 are arranged such that corners of the closure flap 10 distal to the receptacle opening 3 are insertable into the pockets 11 when the closure flap 10 in the folded position. The pockets 11 retain the closure flap 10 in the folded position, whilst at the same time allowing the closure flap 10 to be easily releasable from the pockets 11 for moving to the unfolded position. A pull strap 12 is provided that extends from the interior volume of the receptacle 2, through the receptacle opening 3 to the outside of the receptacle 2. The pull strap 12 is attached at one end to an inside surface of the receptacle 2 at an attachment point 13.

The attachment point 13 is positioned at a location along the length of the receptacle 2, such that the distance between the attachment point 13 and the receptacle opening 3 is less than the length of the life vest 4 the life vest stowage device 1 is intended to accommodate. A loop 14 is provided at the other end of the pull strap 12, to improve the ease with which a user can grasp the pull strap 12. The pull strap 12 also has a pull strap aperture 15. The pull strap aperture 15 is provided part way alone the length of the pull strap 12, as described in more detail below.

With the life vest stowage device 1 in the open configuration, the pull strap 12 extends from the attachment point 13 out through the receptacle opening 3. The attachment point 13 is located on an inside surface of the second side wall of the receptacle 2. With the life vest 4 fully inserted into the receptacle 2, the pull strap 12 is arranged to run from the attachment point 13 towards the rear of the receptacle 2, around the life vest 4, then along the inside surface of the receptacle 2 opposite to the inside surface on which the attachment point is provided 13, and out through the receptacle opening 3.

With the life vest stowage device 1 in the closed configuration, the pull strap 12 extends out through the receptacle opening 3 via the inner flap pocket 6. More specifically, the pull strap 12 passes through the receptacle opening 3, into the inner flap pocket 6, between the portion 8 of the second side wall forming the inner flap pocket 6 and the inner flap 5 located in the inner flap pocket 6, around the edge of the inner flap 5 distal to the receptacle 2 (in the unfolded position), between the inner flap 5 and the pocket side wall 7, around an edge of the pocket side wall 7 at the pocket opening 9, between the pocket side wall 7 and the closure flap 10, around the edge of the closure flap 10 distal to the receptacle 2 (in the unfolded position) and over an outwardly facing surface of the closure flap 10.

The pocket side wall 7 and closure flap 10 each have a guide 16 for the pull strap 12. The guide 16 of the pocket side wall 7 comprises a recess along the edge of the pocket side wall 7 at the pocket opening 9. The guide 16 of the closure flap 10 comprises a recess along the edge of the closure flap 10 distal to the receptacle 2. The guides 16 are provided centrally with respect the width of the life vest stowage device 1, so as to cause the pull strap 12 to pass out through the receptacle opening 3, with the life vest stowage device 1 in the closed configuration, at a location central to the width of the receptacle opening 3.

The life vest stowage device 1 has first and second tabs 17, 18. In fact, only one tab 17, 18 is required in order for the life vest stowage device 1 to function, but two tabs 17, 18 are advantageous as they allow the mechanism by which the life vest stowage device 1 is opened to have improved symmetry. As can be seen most clearly in FIG. 5, the first tab 17 has a first tab head 19 and a first tab body 20. It also has a first tab neck 21 between the first tab head 19 and the first tab body 20. Similarly, the second tab 18 has a second tab head 22 and a second tab body 23, along with a second tab neck 24 between the second tab head 22 and the second tab body 23. The first tab head 19 is wider than the first tab body 20, which in turn in wider than the first tab neck 21. The second tab head 22 is wider than the second tab body 23, which in turn in wider than the second tab neck 24. Both the first and the second tabs 17, 18 are flat. In this embodiment, they each comprise a sheet of the second material.

A first tab aperture 25 is provided in the first tab 17 and a second tab aperture 26 is provided in the second tab 18. In this embodiment, the first tab aperture 25 is located in the first tab body 20 and the second tab aperture 26 is located in the second tab body 23. The first and second tab apertures 25, 26 are reinforced. In this embodiment, the reinforcement comprises a metal eyelet pressed into each of the first and second tab apertures 25, 26. Other types of reinforcement are used in other embodiments. In yet other embodiments, no reinforcement is provided.

It can be appreciated that, in the illustrated embodiment at least, the first and second tabs 17, 18 are identical to one another. This is not a necessity, but it does have the advantage that the first and second tabs 17, 18 are interchangeable with one another.

The life vest stowage device 1 also has first and second tab receiving apertures 27, 28. In this embodiment, the first and second tab receiving apertures 27, 28 are provided in the pocket side wall 7, at locations that are covered by the closure flap 10 in the folded position. However, in other embodiments, the first and second tab receiving apertures 27, 28 are provided elsewhere, for example in the second side wall of the receptacle 2, although it is generally advantageous that the first and second tab receiving apertures 27, 28 are covered by the closure flap 10 in the folded position, wherever they are provided, so as to prevent access to them when the life vest stowage device 1 in the closed configuration.

The first tab head 19 of the first tab 17 is wider than the first tab receiving aperture 27 and the second tab head 22 of the second tab 18 is wider than the second tab receiving aperture 28. The first tab neck 21 of the first tab 17 is narrower than the first tab receiving aperture 27 and the second tab neck 24 of the second tab 18 is narrower than the second tab receiving aperture 28.

The first tab body 20 is slightly wider than the first tab receiving aperture 27, but only to the extent that the first tab body 20 must be deformed in order to pass through the first tab receiving aperture 27. This means that, if the first tab 17 is inserted into the first tab receiving aperture 27 by passing the first tab body 20 through the first tab receiving aperture 27, the first tab 17 tends to lie in the first tab receiving aperture 27 with the first tab neck 21 coincident with the first tab receiving aperture 27. The first tab 17 cannot be pulled all the way through the first tab receiving aperture 27 because of the width of the first tab head 19. Similarly, as the first tab body 20 must be deformed to pass through the first tab receiving aperture 27, the first tab 17 resists passing back out of the first tab receiving aperture 27 from the side via which it was inserted, although it can be extracted if sufficient force is exerted to deform the first tab body 20.

The second tab body 23 is slightly wider than the second tab receiving aperture 28, but only to the extent that the second tab body 23 must be deformed in order to pass through the second tab receiving aperture 28. This means that, if the second tab 18 is inserted into the second tab receiving aperture 28 by passing the second tab body 23 through the second tab receiving aperture 28, the second tab 18 tends to lie in the second tab receiving aperture 28 with the second tab neck 24 coincident with the second tab receiving aperture 28. The second tab 18 cannot be pulled all the way through the second tab receiving aperture 28 because of the width of the second tab head 22. Similarly, as the second tab body 23 must be deformed to pass through the second tab receiving aperture 28, the second tab 18 resists passing back out of the second tab receiving aperture 28 from the side via which it was inserted, although it can be extracted if sufficient force is exerted to deform the second tab body 23.

In this embodiment, the first and second tab heads 19, 20 actually have the same widths as one another, the first and second tab necks 21, 22 have the same widths as one another and the first and second tab receiving apertures 27, 28 have the same widths as one another. However, this is not necessary and the first and second tabs 17, 18 and first and second tab receiving apertures 27, 28 can have different dimensions from one another in other embodiments.

When the closure flap 10 is in the folded position, the closure flap 10 covers the first and second tab receiving apertures 27, 28. Moreover, with the first and second tabs 17, 18 inserted in the first and second tab receiving apertures 27, 28, the first and second tabs 17, 18 are disposed under the closure flap 10. However, the closure flap 10 is arranged to expose the first and second tabs 17, 18, so that they may be accessed from the outwardly facing side of the closure flap 10. This can be achieved by the closure flap 7 having an appropriately positioned hole therethrough. However, in this embodiment, the closure flap 10 has first and second closure flap apertures 29, 30. The first and second closure flap apertures 29, 30 are located to be close to, but offset from, the first and second tab receiving apertures 27, 28.

With the life vest stowage device 1 in the closed configuration, the tab body 20 of the first tab 17 protrudes through the first closure flap aperture 29 and the second tab 18 protrudes through the second closure flap aperture 30. The pull strap 12 passes over the outer surface of the closure flap 10 between first and second closure flap apertures 29, 30, and the pull strap aperture 15 is arranged at a position along the length of the pull strap 12 such that the pull strap aperture 15 is located between the first tab aperture 25 and the second tab aperture 26.

Figure 5:
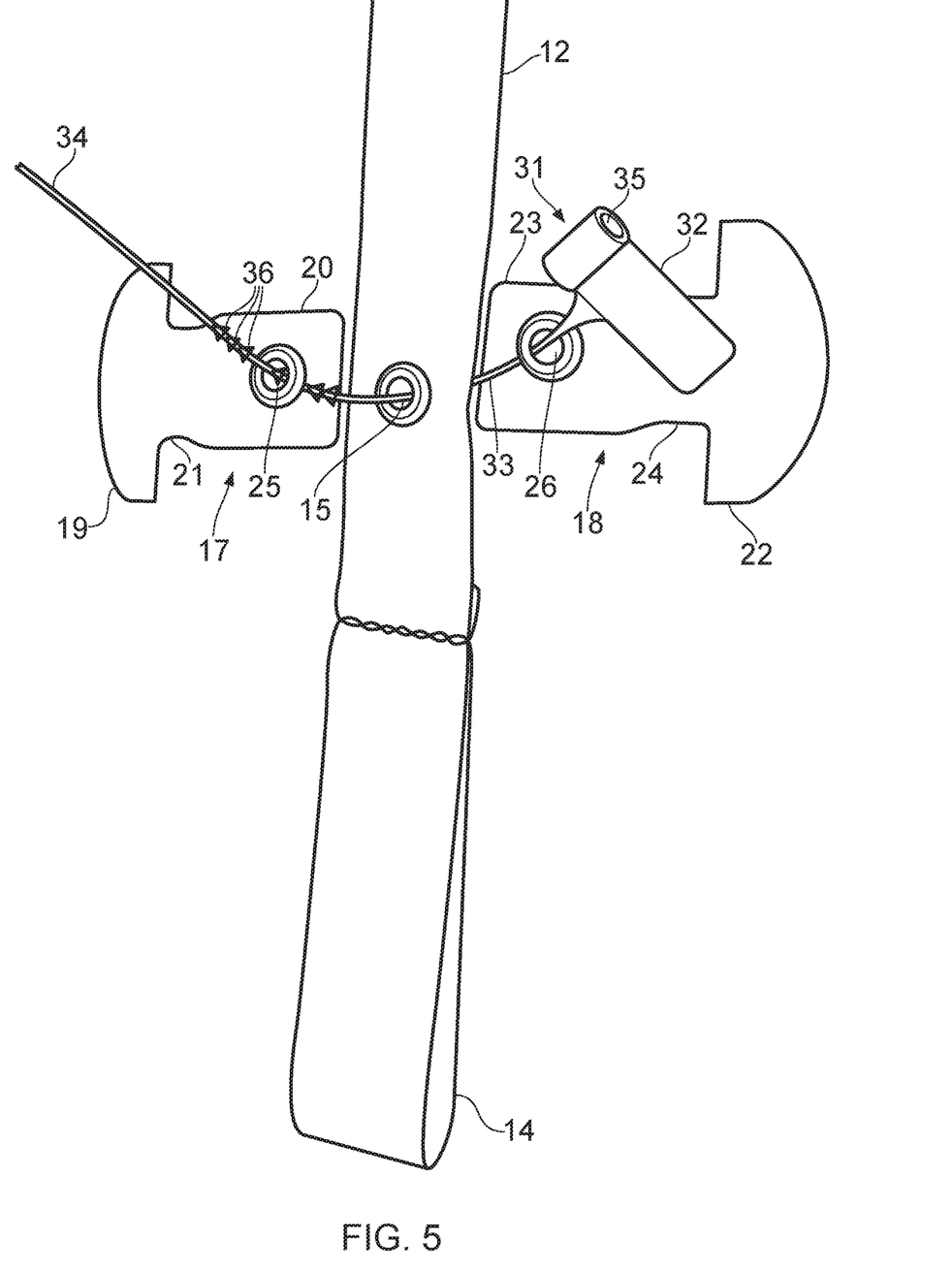
FIG. 5 is a front view of a frangible seal, first and second tabs and a pull strap of the life vest stowage device.

A frangible seal 31 comprises a seal head 32 and an elongate member 33. The elongate member 33 is attached to the seal head 32 at one end. At the other end of the elongate member 33 there is a tip 34 that is insertable into a seal head aperture 35 to form a closed loop. Teeth 36 are provided along the length of the elongate member 33. The teeth 36 cooperate with a pawl (not shown) provided in the seal head aperture 35 to form a ratchet that resists retraction of the elongate member 33 from the seal head aperture 35 from the side of the seal head aperture 35 via which the elongate member 33 is inserted into the seal head aperture 35. Once the ratchet is engaged, the closed loop of the frangible seal 31 is opened by the elongate member 33 breaking.

The frangible seal 31 can take a variety of forms. In this embodiment, the frangible seal 31 is a pull-tight fly seal, as conventionally used in the airline industry for other sealing requirements. The material of the frangible seal 31 is polypropylene or nylon. The force required to break the closed loop of the frangible seal 31 is typically between 40N and 80N. It is more preferably between 60N and 80N, but in one specific example, where the frangible seal 31 is polypropylene, the force is around 48N.

The frangible seal 31 is insertable through the pull strap aperture 15 and the first and second tab apertures 25, 26. More specifically, the pull strap aperture 15 and the first and second tab apertures 25, 26 have diameters sufficiently large for the elongate member 33 of the frangible seal 31 to pass through. Moreover, with the life vest stowage device 1 in the closed configuration, the pull strap 12 and the first and second tabs 17, 18 are located close enough to one another that the closed loop of the frangible seal 31 can extend through all of the pull strap aperture 15 and the first and second tab apertures 25, 26 at once. With the frangible seal so located, the pull strap 12 is secured to the first and second tabs 17, 18, with the result that the closure flap 10 is secured to the pocket side wall 7.

A fastener is provided to secure the pull strap 12 in position when the life vest stowage device 1 is in the closed configuration. In this embodiment, the fastener is a hook and loop fastener, such as Velcro®. The fastener comprises a first and second fastener parts 36, 37 provided on opposing sides of the pull strap 12, along with a third fastener part 38 provided on the outwardly facing surface of the portion 8 of the second side wall of the receptacle 2 forming the inner flap pocket 6 and a fourth part 39 located on an inwardly facing surface of the inner flap 5. The first and third fastener parts 36, 38 cooperate with one another to fasten the pull strap 12 to the portion 8 of the second side wall of the receptacle 2 forming the inner flap pocket 6. Similarly, the second and fourth fastener parts 37, 39 cooperate with one another to fasten the pull strap 12 to the inner surface of the inner flap 5. Where the fastener is a hook and loop fastener, typically each pair of fastener parts 36, 37, 38, 39, e.g. the first and third fastener parts 36, 38 and second and fourth fastener parts 37, 39, each comprise one part with hooks and one part with loops. As can be seen best in FIG. 3, the third and fourth fastener parts 38, 39 are wider than the pull strap 12 and, in the closed configuration, they come into direct contact with one another either side of the pull strap 12. Preferably, the third and fourth fastener parts 38, 39 are also therefore arranged to fasten to one another, for example with one having hooks and the other having loops.

In use, the life vest 4 is inserted into the receptacle 2 through the receptacle opening 3, with the life vest stowage device 1 in the open configuration. When the life vest stowage device 1 is mounted under an aircraft seat, it is oriented with the second side wall of the receptacle 2, on which the attachment point 13 is provided, at the top and the pull strap 12 tends to hang down across the height of the interior volume of the receptacle 2. As the life vest 4 is inserted into the receptacle 2 it pushes the pull strap 12 towards the back of the receptacle 2. With the life vest 4 fully inserted into the receptacle 2, the pull strap 12 runs from the attachment point 13 towards the rear of the receptacle 2, around the life vest 4, then along the inside surface of the receptacle 2 opposite to the inside surface on which the attachment point 13 is provided, and out through the receptacle opening 3. The length of the pull strap is sufficient that, even in this configuration, the loop 14 is located outside of the receptacle 2.

With the life vest 4 inside the receptacle 2, the life vest stowage device 1 is moved to the closed configuration. Specifically, the inner flap 5 and closure flap 10 are moved to their folded positions so as to obstruct the receptacle opening 3. First, the inner flap 5 is folded along the edge of the inner flap 5 at which it is attached to the receptacle 2. This allows the inner flap 5 to be inserted into the inner flap pocket 6. As the inner flap 5 is inserted into the inner flap pocket 6 it pushes the pull strap 12 ahead of it into the inner flap pocket. The pull handle 12 folds over the edge of the inner flap 5 distal to the receptacle 2. At the same time, the first and third fastener parts 36, 38 come into contact with one another, the second and fourth fastener parts 37, 39 come into contact with one another and the third and fourth fastener parts 38, 39 come into contact with one another.

This causes the pull strap 12 and the inner flap 5 to be retained in the inner flap pocket 6. The first and second tabs 17, 18 are inserted into the first and second tab receiving apertures 27, 28. More specifically, the first tab body 20 is inserted through the first tab receiving aperture 27 in a direction towards the outside of the receptacle 2, which in this embodiment is from the inside of the inner flap pocket 6 to the outwardly facing side of the pocket side wall 7. Likewise, the second tab body 23 is inserted through the second tab receiving aperture 28 in a direction towards the outside of the receptacle 2, which again in this embodiment is from the inside of the inner flap pocket 6 to the outwardly facing side of the pocket side wall 7. The first and second tab heads 19, 22 prevent the first and second tabs 17, 18 passing all the way through the first and second tab receiving holes 27, 28, and the first and second tabs 17, 18 are thus retained in the first and second tab receiving apertures 27, 28.

The closure flap 10 is then moved to its folded position by being folded along the edge of the closure flap 10 by which the closure flap 10 is attached to the receptacle 1. As the closure flap 10 is moved to the folded position, the pull strap 12 folds around the edge of the pocket side wall 7 adjacent the pocket opening 9 so as to extend between the pocket side wall 7 and the closure flap 10. The first and second tab bodies 17, 18 are manipulated so as to extend through the first and second closure flap apertures 29, 30, and the closure flap 10 is manipulated so as to be inserted into the closure flap pockets 11.

Next, the pull strap aperture 15 is aligned with the first and second tab apertures 25, 26 and the elongate member 33 of the frangible seal 31 is threaded through the apertures 15, 25, 26. The frangible seal 31 is then locked by inserting the tip 34 of the elongate member 33 into the head aperture 35 of the frangible seal 31. This secures the life vest stowage device 1 in the closed configuration.

Should a passenger need to retrieve the life vest 4 from the life vest stowage device 1, the passenger pulls the pull strap 12 away from the receptacle 2. This urges the frangible seal 31 to break, allowing the pull strap 12 to be pulled further. Continuing to pull the pull strap 12 moves the closure flap 10 away from the pocket side wall 7 and the closure flap 10 to be removed from the closure flap pockets 11. Continuing to pull the pull strap 12 causes the fastener to unfasten and for the inner flap 5 to be removed from the inner flap pocket 6. The receptacle opening 3 is now unobstructed. Finally, further pulling of the pull strap 12 urges the life vest 4 out of the receptacle 2. The passenger can then grasp the life vest 4 and remove it from the life vest stowage device 1.

The life vest stowage device 1 is described above for use with a frangible seal 31 comprising a pull-tight fly seal. This is useful because such pull-tight fly seals are cheaply available. However, and important advantage of the life vest stowage device 1 is that it can also be used with other types of seals, in particular seals of very different construction to pull-tight fly seals. More particularly, the frangible seal 31 may be a stick-on seal. Such a seal is generally flat.

Figure 6:
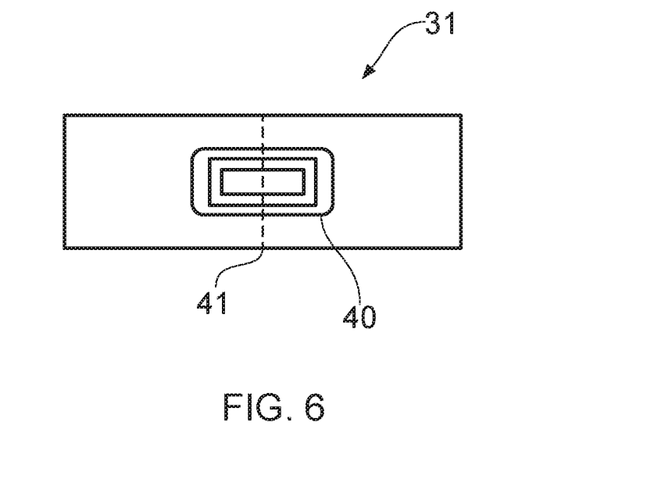
FIG. 6 is a front view of an alternative frangible seal.
Figure 7:
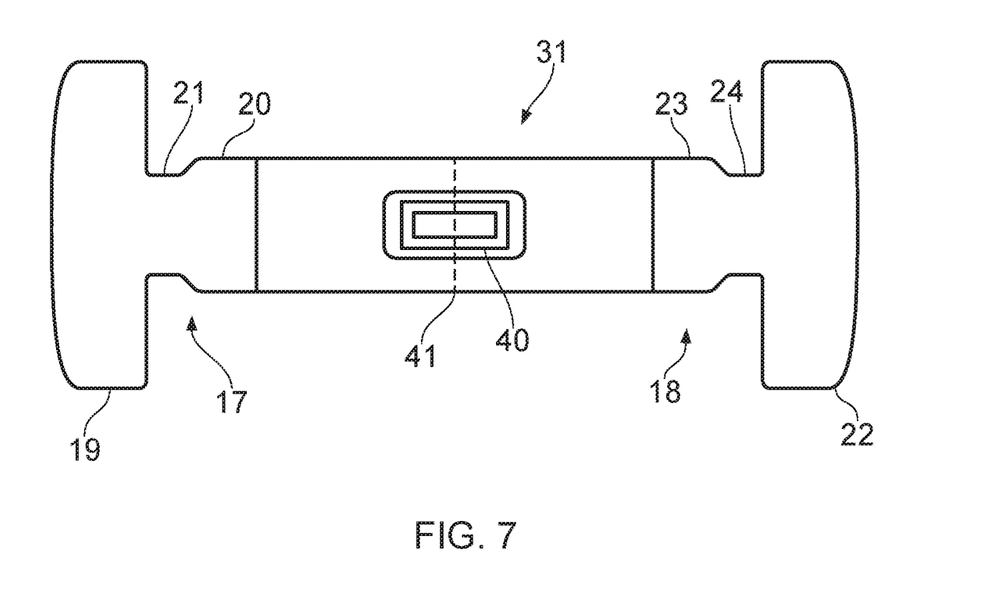
FIG. 7 is a front view of the alternative frangible seal in position on the first and second tabs.

In one particular embodiment, the frangible seal 31 is a Radio-Frequency Identification (RFID) stick-on seal, as shown in FIGS. 6 and 7. In this embodiment, the frangible seal 31 comprises a stick-on strip incorporating an RFID component 40. A line of weakness bisects the stick-on strip and the RFID component 40, such that pulling the ends of the stick-on strip away from one another causes the frangible seal 31 to break along the line of weakness 41. With the frangible seal broken along the line of weakness, the RFID component 40 ceases to function.

Referring to FIG. 7, in this embodiment, with the life vest stowage device 1 in the closed configuration, and the first and second tabs 17, 18 located as described above, the frangible seal 31 is located between the first tab body 20 of the first tab 17 and the second tab body 23 of the second tab 18. This means that the frangible seal extends over the outwardly facing surface of the closure flap 10 between the first tab aperture 25 and the second tab aperture 26. The pull strap 12 is not secured to the first and second tabs 17, 18, but the closure flap 10 is still secured to the pocket side wall 7 just by the frangible seal 31.

When the passenger wishes to retrieve the life vest 4 from the receptacle, the passenger pulls the pull strap 12 as before. However, this time the pull strap 12 causes the frangible seal 31 to break be causing the closure flap 10 to move away from the pocket side wall 7 and the first and second tabs 17, 18 to move apart from one another.

In this way, the life vest stowage device 1 can function in much the same way as the life vest stowage device described in patent publication number WO2015/145121, the contents of which are incorporated herein by reference.

Other variations and modifications will be apparent to the skilled person. Such variations and modifications may involve equivalent and other features which are already known and which may be used instead of, or in addition to, features described herein.

Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

What is claimed is:

1. A life vest stowage device comprising:
a receptacle defining an interior volume;
an opening through which the interior volume is accessible from outside of the receptacle;
a first tab having a first tab aperture;
a closure flap moveable between an unfolded position when the life vest stowage device is in an open configuration, in which unfolded position the opening is uncovered, and a folded position when the life vest stowage device is in a closed configuration, in which folded position the closure flap at least partially covers the opening and the first tab is exposed through the closure flap to allow access to the first tab aperture from an outer side of the closure flap;
a pull strap extending from the interior volume through the opening so as to be able to pass over the outer side of the closure flap, the pull strap having a pull strap aperture; and
a frangible seal,
wherein, in the closed configuration, the pull strap is securable to the first tab from the outer side of the closure flap by the frangible seal extending between the pull strap aperture and the first tab aperture such that the closure flap can only be moved to the unfolded position by moving the pull strap aperture and the first tab aperture away from one another so as to break the frangible seal.

2. The life vest stowage device according to claim 1, wherein, in the closed configuration, a portion of the pull strap lies between the closure flap and the receptacle such that pulling an end of the pull strap distal from the receptacle away from the receptacle causes the closure flap to move to the unfolded position.

3. The life vest stowage device according to claim 1, wherein the frangible seal comprises a seal head and an elongate member, wherein the elongate member cooperates with the seal head to form a closed loop, and wherein breaking the frangible seal involves breaking the closed loop.

4. The life vest stowage device according to claim 3, wherein the elongate member is attached at one end to the seal head and the seal head has a seal head aperture through which the other end of the elongate member can be inserted to form the loop.

5. The life vest stowage device according to claim 4, wherein the elongate member and the seal head aperture form a ratchet arranged such that the elongate member resists withdrawal from the side of the seal head aperture via which it is inserted.

6. The life vest stowage device according to claim 5, wherein the elongate member resists withdrawal from the side of the seal head aperture via which it is inserted sufficiently that the closed loop breaks by the elongate member breaking rather than withdrawing from the seal head aperture.

7. The life vest stowage device according to claim 3, wherein the frangible seal is polypropylene or nylon.

8. The life vest stowage device according to claim 1, wherein the closure flap has a first closure flap aperture through which the first tab is exposed in the closed configuration.

9. The life vest stowage device according to claim 1, comprising a second tab having a second tab aperture, wherein, in the closed configuration, the second tab aperture is exposed through the closure flap to allow access to the second tab aperture from the outer side of the closure flap and the pull strap is securable to the second tab from the outer side of the closure flap by the frangible seal additionally extending between the pull strap aperture and the second tab aperture such that the closure flap can only be moved to the unfolded position by moving the pull strap aperture away from both the first tab aperture and the second tab aperture so as to break the frangible seal.

10. The life vest stowage device according to claim 9, wherein the closure flap has a second closure flap aperture through which the second tab is exposed in the closed configuration.

11. The life vest stowage device according to claim 10, the first tab having a tab head wider than the first tab receiving aperture and a neck narrower than the first tab receiving aperture, and the second tab having a tab head wider than the second tab receiving aperture and a neck narrower than the second tab receiving aperture.

12. The life vest stowage device according to any one of claim 9, wherein, in the closed configuration, the pull strap is locatable between the first tab and the second tab.

13. The life vest stowage device of claim 1, comprising an inner flap located towards the interior volume of the receptacle inward in relation to the closure flap, the inner flap being foldable between the unfolded position when the life vest stowage device is in the open configuration, in which unfolded position the opening is uncovered, and a folded position when the life vest stowage device is in the closed configuration, in which folded position the inner flap at least partially covers the opening.

14. The life vest stowage device according to claim 13, wherein the life vest stowage device has a pocket into which the inner flap is insertable in the folded configuration.

15. The life vest stowage device according to claim 1, wherein the life vest stowage device has a pocket into which the closure flap is insertable in the folded configuration.

16. The life vest stowage device according to claim 1, wherein the receptacle of the life vest stowage device comprises a first material and the closure flap comprises a second material, wherein the second material is different from the first material.

17. The life vest stowage device according to claim 16, wherein the second material is stiffer than the first material.

18. The life vest stowage device according to claim 17, wherein the second material is a polycarbonate film.

* * * * *

UNITED STATES PATENT AND TRADEMARK OFFICE
CERTIFICATE OF CORRECTION

| | |
|---|---|
| PATENT NO. | : 11,352,141 B2 |
| APPLICATION NO. | : 16/701178 |
| DATED | : June 7, 2022 |
| INVENTOR(S) | : Noel Gregory Philip White |

It is certified that error appears in the above-identified patent and that said Letters Patent is hereby corrected as shown below:

On the Title Page

Item (30) Foreign Application Priority Data:
Line 1, "1600820" should be changed to -- 1600820.3 --
Line 2, "1601333" should be changed to -- 1601333.6 --

Signed and Sealed this
Tenth Day of January, 2023

Katherine Kelly Vidal
*Director of the United States Patent and Trademark Office*